United States Patent
Akashi

(10) Patent No.: US 11,427,035 B2
(45) Date of Patent: Aug. 30, 2022

(54) PNEUMATIC TIRE

(71) Applicant: The Yokohama Rubber Co., LTD., Tokyo (JP)

(72) Inventor: Yasutaka Akashi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 152 days.

(21) Appl. No.: 16/075,526

(22) PCT Filed: Feb. 9, 2017

(86) PCT No.: PCT/JP2017/004822
§ 371 (c)(1),
(2) Date: Aug. 3, 2018

(87) PCT Pub. No.: WO2017/138622
PCT Pub. Date: Aug. 17, 2017

(65) Prior Publication Data
US 2019/0039420 A1   Feb. 7, 2019

(30) Foreign Application Priority Data

Feb. 10, 2016 (JP) .............................. JP2016-023544

(51) Int. Cl.
*B60C 11/12* (2006.01)
*B60C 11/11* (2006.01)
(Continued)

(52) U.S. Cl.
CPC .......... *B60C 11/1218* (2013.01); *B60C 11/03* (2013.01); *B60C 11/0309* (2013.01);
(Continued)

(58) Field of Classification Search
CPC combination set(s) only.
See application file for complete search history.

(56) References Cited

U.S. PATENT DOCUMENTS

2002/0170643 A1   11/2002   Kuze
2003/0226629 A1*  12/2003   Kimishima ......... B60C 11/0306
                                                   152/209.18
(Continued)

FOREIGN PATENT DOCUMENTS

CN        1456452       11/2003
CN      101298229       11/2008
(Continued)

OTHER PUBLICATIONS

International Search Report for International Application No. PCT/JP2017/004822 dated May 16, 2017, 3 pages, Japan.

*Primary Examiner* — Timothy Kennedy
*Assistant Examiner* — Farah Taufiq
(74) *Attorney, Agent, or Firm* — Thorpe North & Western

(57) ABSTRACT

A pneumatic tire is provided with four or more circumferential main grooves extending in a tire circumferential direction and five or more land portions defined by the circumferential main grooves. Additionally, second land portions are each provided with first through lug grooves and second through lug grooves that extend through the second land portion in a tire lateral direction and are adjacently arranged in the tire circumferential direction. Crossing angles of the first through lug grooves and the second through lug grooves with respect to the outermost circumferential main grooves are mutually different.

20 Claims, 10 Drawing Sheets

(51) Int. Cl.
*B60C 11/03* (2006.01)
*B60C 11/13* (2006.01)

(52) U.S. Cl.
CPC ........... *B60C 11/0311* (2013.01); *B60C 11/11* (2013.01); *B60C 11/1384* (2013.01); *B60C 2011/0341* (2013.01); *B60C 2011/0346* (2013.01); *B60C 2011/0358* (2013.01); *B60C 2011/0365* (2013.01); *B60C 2011/0374* (2013.01); *B60C 2011/0381* (2013.01); *B60C 2011/0383* (2013.01); *B60C 2011/1213* (2013.01)

(56) References Cited

U.S. PATENT DOCUMENTS

| | | | |
|---|---|---|---|
| 2008/0271826 | A1 | 11/2008 | Maxwell et al. |
| 2009/0320982 | A1 | 12/2009 | Ochi |
| 2013/0192731 | A1* | 8/2013 | Oji ...................... B60C 11/0302 152/209.8 |
| 2014/0014246 | A1* | 1/2014 | Fujita ................. B60C 11/0302 152/209.18 |
| 2016/0152092 | A1* | 6/2016 | Sasaki ................ B60C 11/0304 152/209.18 |
| 2016/0361953 | A1* | 12/2016 | Fujioka ................. B60C 11/032 |
| 2017/0239997 | A1 | 8/2017 | Nishino |
| 2018/0022162 | A1 | 1/2018 | Takemori |

FOREIGN PATENT DOCUMENTS

| | | | |
|---|---|---|---|
| CN | 101489808 | | 7/2009 |
| CN | 203418936 | U * | 2/2014 |
| DE | 11 2015 003 720 | | 5/2017 |
| JP | H08-142612 | | 6/1996 |
| JP | 2003-118321 | | 4/2003 |
| JP | 2003118321 | A * | 4/2003 |
| JP | 2005-238905 | | 9/2005 |
| JP | 2005238905 | A * | 9/2005 |
| JP | 3718021 | | 11/2005 |
| JP | 3894743 | | 3/2007 |
| JP | 4316452 | | 8/2009 |
| JP | 2010-208419 | | 9/2010 |
| JP | 2013-119282 | | 6/2013 |
| JP | 2013119282 | A * | 6/2013 |
| WO | WO 2008/015904 | | 2/2008 |
| WO | WO 2016/024443 | | 2/2016 |
| WO | WO 2016/121874 | | 8/2016 |

* cited by examiner

| | | CONVENTIONAL EXAMPLE | COMPARATIVE EXAMPLE | EXAMPLE 1 | EXAMPLE 2 | EXAMPLE 3 | EXAMPLE 4 |
|---|---|---|---|---|---|---|---|
| 2nd-SH BLOCK ARRANGEMENT | | SIDE BY SIDE | STAGGERED | STAGGERED | STAGGERED | STAGGERED | STAGGERED |
| SECOND, FIRST THROUGH LUG GROOVE | INCLINATION ANGLE θ21 [deg] | 60 | 60 | 52 | 52 | 52 | 52 |
| | CROSSING ANGLE φ21 [deg] | 72 | 72 | 72 | 72 | 72 | 72 |
| | GROOVE WIDTH Wg21_t [mm] | 6 | 6 | 6 | 6 | 6 | 6 |
| | OPENING WIDTH Wo21 [mm] | 6 | 6 | 6 | 6 | 6 | 6 |
| SECOND, SECOND THROUGH LUG GROOVE | INCLINATION ANGLE θ22 [deg] | 60 | 60 | 42 | 34 | 20 | 20 |
| | CROSSING ANGLE φ21 [deg] | 72 | 72 | 62 | 40 | 22 | 40 |
| | GROOVE WIDTH Wg22_t [mm] | 6 | 6 | 6 | 6 | 6 | 6 |
| | OPENING WIDTH Wo22 [mm] | 6 | 6 | 6 | 6 | 6 | 8 |
| θ21-θ22 [deg] | | 0 | 0 | 10 | 18 | 32 | 32 |
| φ21-φ22 [deg] | | 0 | 0 | 10 | 32 | 50 | 32 |
| Wo22-Wo21 [mm] | | 0 | 0 | 0 | 0 | 0 | 2 |
| SH, THROUGH LUG GROOVE | INCLINATION ANGLE θ31 [deg] | 78 | 78 | 78 | 78 | 78 | 78 |
| | CROSSING ANGLE φ21 [deg] | 70 | 70 | 70 | 70 | 70 | 70 |
| | GROOVE WIDTH Wg31_d [mm] | 7.0 | 7.0 | 7.0 | 7.0 | 7.0 | 7.0 |
| SH, NON-THROUGH LUG GROOVE | GROOVE WIDTH Wg32_d [mm] | – (NO) | – (NO) | – (NO) | – (NO) | – (NO) | – (NO) |
| De_max/De_min | | 1.00 | 1.00 | 1.00 | 1.00 | 1.00 | 1.00 |
| STEERING STABILITY ON SNOW | | 100 | 90 | 97 | 98 | 97 | 99 |
| STARTABILITY PERFORMANCE ON SNOW | | 100 | 110 | 110 | 111 | 110 | 111 |

FIG. 10A

| | | EXAMPLE 5 | EXAMPLE 6 | EXAMPLE 7 | EXAMPLE 8 | EXAMPLE 9 | EXAMPLE 10 |
|---|---|---|---|---|---|---|---|
| 2nd-SH BLOCK ARRANGEMENT | | STAGGERED | STAGGERED | STAGGERED | STAGGERED | STAGGERED | STAGGERED |
| SECOND, FIRST THROUGH LUG GROOVE | INCLINATION ANGLE θ21 [deg] | 52 | 52 | 52 | 52 | 52 | 52 |
| | CROSSING ANGLE φ21 [deg] | 72 | 72 | 72 | 72 | 72 | 72 |
| | GROOVE WIDTH Wg21_i [mm] | 6 | 6 | 6 | 6 | 6 | 6 |
| | OPENING WIDTH Wo21 [mm] | 6 | 6 | 6 | 6 | 6 | 6 |
| SECOND, SECOND THROUGH LUG GROOVE | INCLINATION ANGLE θ22 [deg] | 34 | 34 | 34 | 34 | 34 | 34 |
| | CROSSING ANGLE φ21 [deg] | 40 | 40 | 40 | 40 | 40 | 40 |
| | GROOVE WIDTH Wg22_i [mm] | 6 | 6 | 6 | 6 | 6 | 6 |
| | OPENING WIDTH Wo22 [mm] | 12 | 20 | 12 | 12 | 12 | 12 |
| θ21-θ22 [deg] | | 18 | 18 | 18 | 18 | 18 | 18 |
| φ21-φ22 [deg] | | 32 | 32 | 32 | 32 | 32 | 32 |
| Wo22-Wo21 [mm] | | 6 | 14 | 6 | 6 | 6 | 6 |
| SH, THROUGH LUG GROOVE | INCLINATION ANGLE θ31 [deg] | 78 | 78 | 78 | 78 | 78 | 78 |
| | CROSSING ANGLE φ21 [deg] | 70 | 70 | 70 | 70 | 70 | 70 |
| | GROOVE WIDTH Wg31_i [mm] | 7.0 | 7.0 | 7.0 | 7.0 | 7.0 | 7.0 |
| SH, NON-THROUGH LUG GROOVE | GROOVE WIDTH Wg32_cl [mm] | (NO) | (NO) | 4.0 | 4.0 | 4.0 | 4.0 |
| De_max/De_min | | 1.00 | 1.00 | 1.00 | 1.30 | 1.50 | 1.70 |
| STEERING STABILITY ON SNOW | | 100 | 99 | 105 | 106 | 108 | 106 |
| STARTABILITY PERFORMANCE ON SNOW | | 112 | 111 | 112 | 114 | 115 | 115 |

FIG. 10B

PNEUMATIC TIRE

TECHNICAL FIELD

The technology relates to a pneumatic tire and particularly relates to a pneumatic tire with improved snow performance.

BACKGROUND ART

In particular, in a tire for an all-season passenger vehicle and a tire for a light truck, a block pattern provided with a plurality of block rows defined by lug grooves is used to improve the dry performance, wet performance, as well as snow performance of the tire. A conventional pneumatic tire, i.e. known technology, that addresses the improvement of snow performance is described in Japan Patent No. 3718021.

SUMMARY

The present technology provides a pneumatic tire with improved snow performance.

A pneumatic tire according to the technology includes four or more circumferential main grooves extending in a tire circumferential direction, and five or more rows of land portions defined by the circumferential main grooves. When the circumferential main grooves disposed on the left and right on outermost sides in a tire lateral direction are defined as outermost circumferential main grooves, the land portions disposed on the left and right on the outermost sides in the tire lateral direction are defined as shoulder land portions, and the land portions disposed on the left and right in second rows from the outer sides in the tire lateral direction are defined as second land portions, the second land portions each include first through lug grooves and second through lug grooves that extend through the second land portion in the tire lateral direction and are adjacently arranged in the tire circumferential direction. The first through lug grooves and the second through lug grooves intersect the outermost circumferential main groove at different crossing angles.

In the pneumatic tire according to the technology, the through lug grooves mutually adjacent in the second land portion open to the outermost circumferential main grooves at crossing angles that are mutually different, thereby promoting the discharge of snow that entered a communicating portion between the through lug grooves and the outermost circumferential main grooves during travel on snowy road surfaces. This has the advantage of the snow performance (particularly steering stability and startability) of the tire being improved.

BRIEF DESCRIPTION OF DRAWINGS

FIGS. 10A-10B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to those skilled in the art.

Pneumatic Tire

Figure 1:
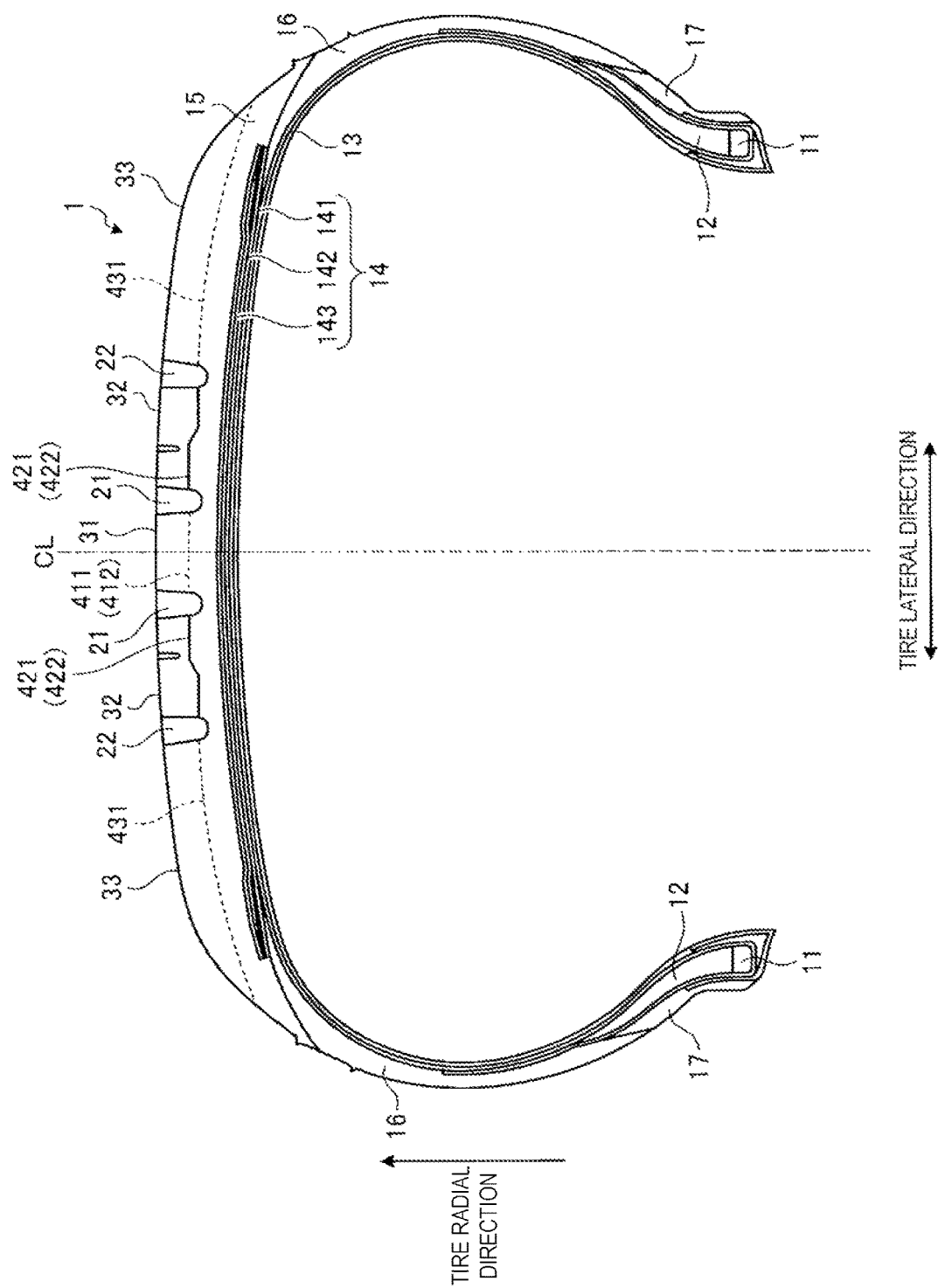
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. FIG. 1 illustrates a cross-sectional view of a half region in a tire radial direction. Also, FIG. 1 illustrates a radial tire for a passenger vehicle as an example of a pneumatic tire.

In reference to FIG. 1, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed outward of the pair of bead cores 11, 11 in the tire radial direction and constitute the bead portions.

The carcass layer 13 has a single layer structure made of one carcass ply or a multilayer structure made of a plurality of carcass plies, and extends between the left and right bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is made by a process of covering a plurality of carcass cords made of steel or an organic fiber material (e.g. aramid, nylon, polyester, rayon, or the like) with a coating rubber and then a rolling process. The carcass ply (plies) has a carcass angle (inclination angle of the fiber direction of the carcass cords with respect to the tire circumferential direction), as an absolute value, ranging from 80 to 95 degrees.

The belt layer 14 is a multilayer structure including a pair of cross belts 141, 142 and a belt cover 143 and is disposed around the outer circumference of the carcass layer 13. The pair of cross belts 141, 142 are made by a process of covering a plurality of belt cords made of steel or an organic fiber material with a coating rubber and then a rolling process. The cross belts 141, 142 have a belt angle, as an absolute value, ranging from 20 to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is made by a process of covering a plurality of cords made of steel or an organic fiber material with a coating rubber and then a rolling process. The belt cover 143 has a belt angle, as an absolute value, ranging from 0 to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
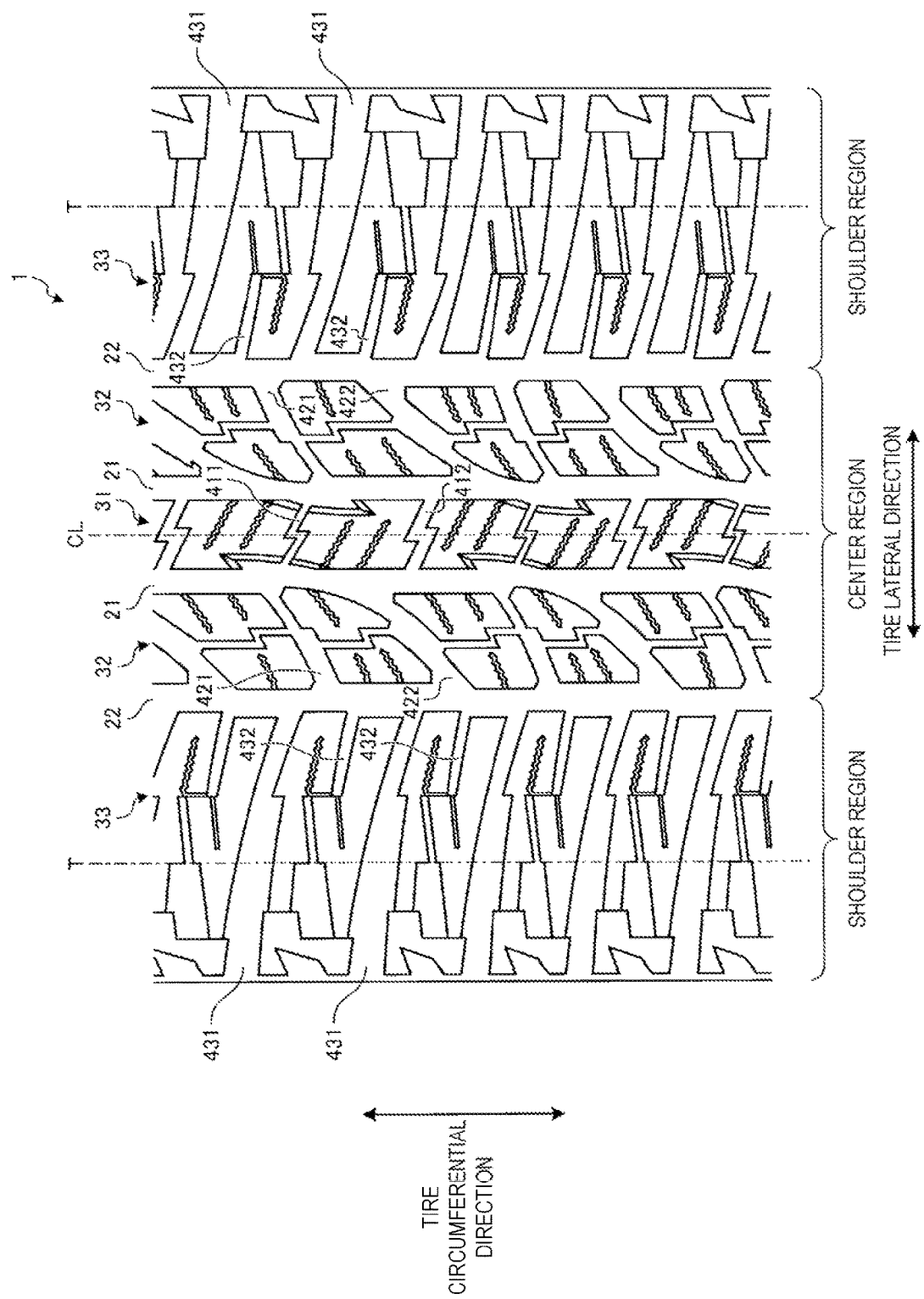
FIG. 2 is a plan view illustrating a tread pattern of the pneumatic tire illustrated in FIG. 1.

FIG. 2 is a plan view illustrating a tread pattern of the pneumatic tire illustrated in FIG. 1. FIG. 2 illustrates a tread pattern for an all-season tire. In reference to FIG. 2, "tire circumferential direction" refers to the direction revolving about the tire rotation axis. Reference sign T denotes a tire ground contact edge.

As illustrated in FIG. 2, the pneumatic tire 1 is provided with, in the tread portion, a plurality of circumferential main grooves 21, 22 extending in the tire circumferential direction, a plurality of land portions 31 to 33 defined by the circumferential main grooves 21, 22, and a plurality of lug grooves 411, 412, 421, 422, 431, 432 disposed in the land portions 31 to 33.

"Circumferential main groove" refers to a circumferential groove with a wear indicator that indicates the terminal stage of wear and typically has a groove width of 5.0 mm or greater and a groove depth of 7.5 mm or greater. Moreover, "lug groove" refers to a lateral groove having a groove width of 2.0 mm or greater and a groove depth of 3.0 mm or greater. Additionally, "sipe", which is described below, refers to a cut formed in a land portion that typically has a sipe width of less than 1.5 mm.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, when viewed in a cross section normal to the groove length direction. Additionally, in configurations in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 has a left-right symmetric tread pattern about the tire equatorial plane CL. Further, four circumferential main grooves 21, 22 are disposed having left-right symmetry about the tire equatorial plane CL. Additionally, five land portions 31 to 33 are defined by the four circumferential main grooves 21, 22. One land portion 31 is disposed on the tire equatorial plane CL.

However, the configuration is not limited to such and five or more circumferential main grooves may be disposed (not illustrated). Further, the circumferential main grooves 21, 22 may be disposed having left-right asymmetry about the tire equatorial plane CL (not illustrated). Additionally, the circumferential main grooves may be disposed on the tire equatorial plane CL (not illustrated). Thus, the land portion 31 may be disposed in a position separated from the tire equatorial plane CL.

Additionally, in the configuration of FIG. 2, the four circumferential main grooves 21, 22 each have a straight shape overall and edge portions of the left and right land portions 31 to 33 protrude on the circumferential main groove 21, 22 sides, causing the groove walls of the circumferential main grooves 21, 22 to form step-like shapes in the tire circumferential direction.

However, no such limitation is intended, and the circumferential main grooves 21, 22 may each have a simple straight shape, or may have a zigzag shape or a wave-like shape that bends or curves while extending in the tire circumferential direction (not illustrated).

Here, the left and right circumferential main grooves 22, 22 located outermost in the tire lateral direction are referred to as outermost circumferential main grooves. Additionally, the tread portion center region and the tread portion shoulder region are defined with the left and right outermost circumferential main grooves 22, 22 serving as boundaries.

The land portions 33 located outermost in the tire lateral direction among the plurality of land portions 31 to 33 defined by the circumferential main grooves 21, 22, are defined as shoulder land portions. The shoulder land portions 33 are land portions outward in the tire lateral direction defined by the outermost circumferential main grooves 22, and include the tire ground contact edge T on the tread surface. The land portions 32 located in the second rows from the outer side in the tire lateral direction are defined as second land portions. The second land portions 32 are each an inner land portion in the tire lateral direction defined by the outermost circumferential main groove 22, and adjacent to the shoulder land portion 33 that sandwich the outermost circumferential main grooves 22. Additionally, the land portion 31 on the tire equatorial plane CL side of the second land portions 32 is defined as a center land portion. The center land portion 31 may be disposed on the tire equatorial plane CL (FIG. 2), or may be disposed in a position separated from the tire equatorial plane CL (not illustrated).

In the configuration of FIG. 2, the land portions 31 to 33 each include the plurality of lug grooves 411, 412; 421, 422; 431, 432, respectively, extending in the tire lateral direction. The lug grooves 411, 412; 421, 422; 431 are through lug grooves that extend through the corresponding land portions 31; 32; 33 in the tire lateral direction, and are arranged at a predetermined interval in the tire circumferential direction. In this way, the land portions 31 to 33 are each divided in the tire circumferential direction by the through lug grooves 411, 412; 421, 422; 431, forming block rows of a plurality of blocks.

Second Land Portions

Figure 3:
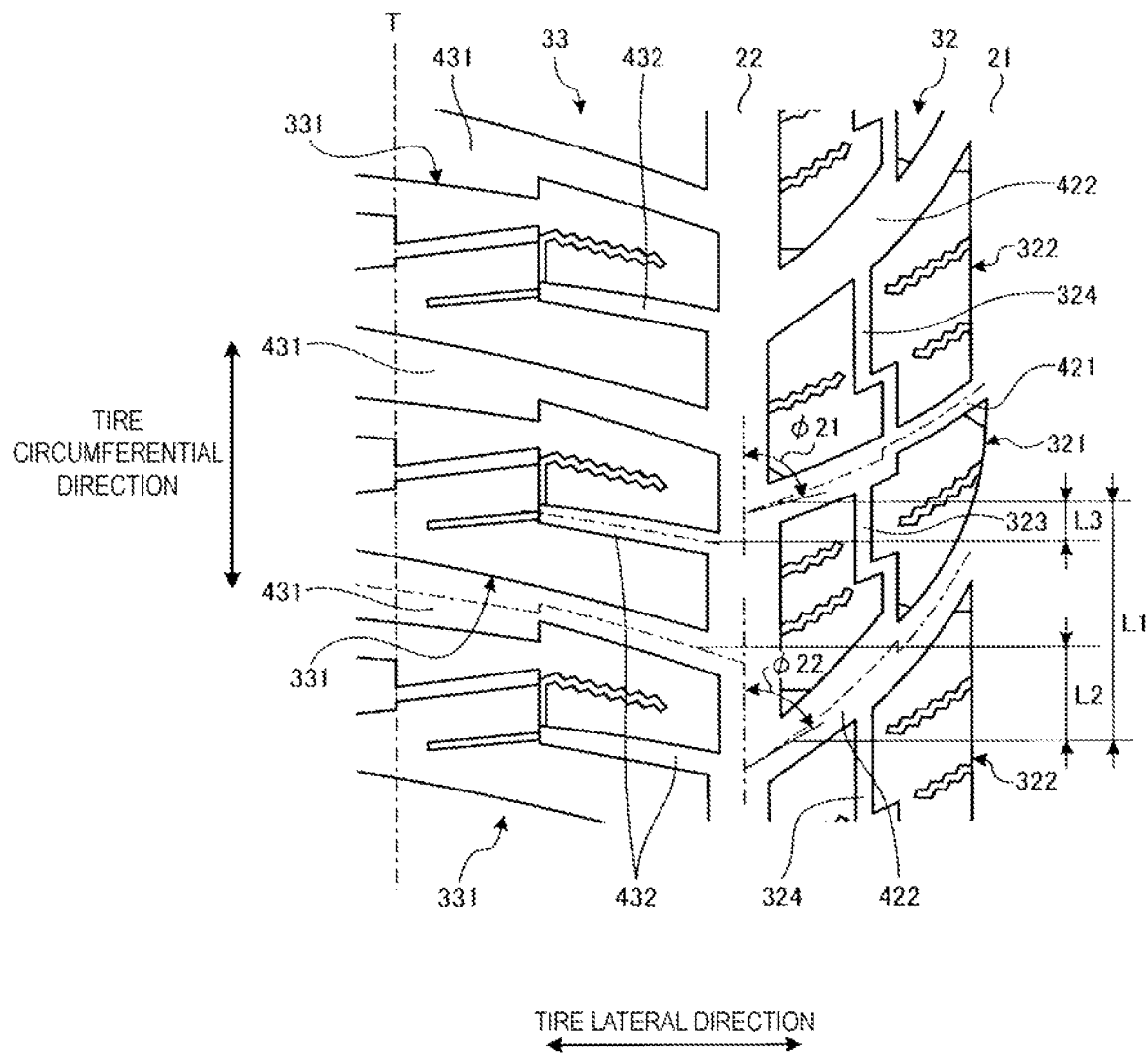
FIG. 3 is an enlarged view illustrating the main portion of the tread pattern illustrated in FIG. 2.
Figure 4:
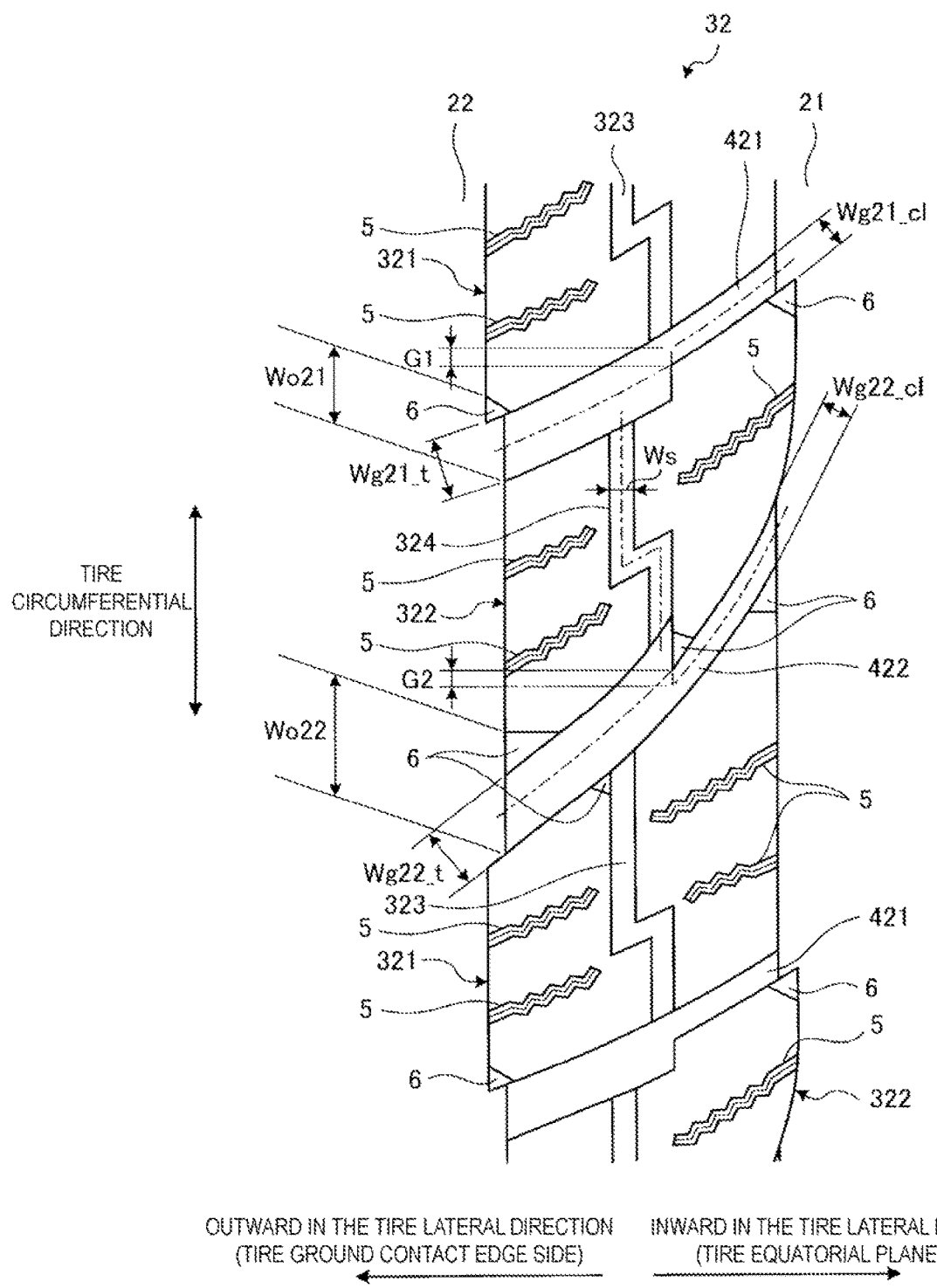
FIG. 4 is an enlarged view illustrating a second land portion of the tread pattern illustrated in FIG. 2.
Figure 5:
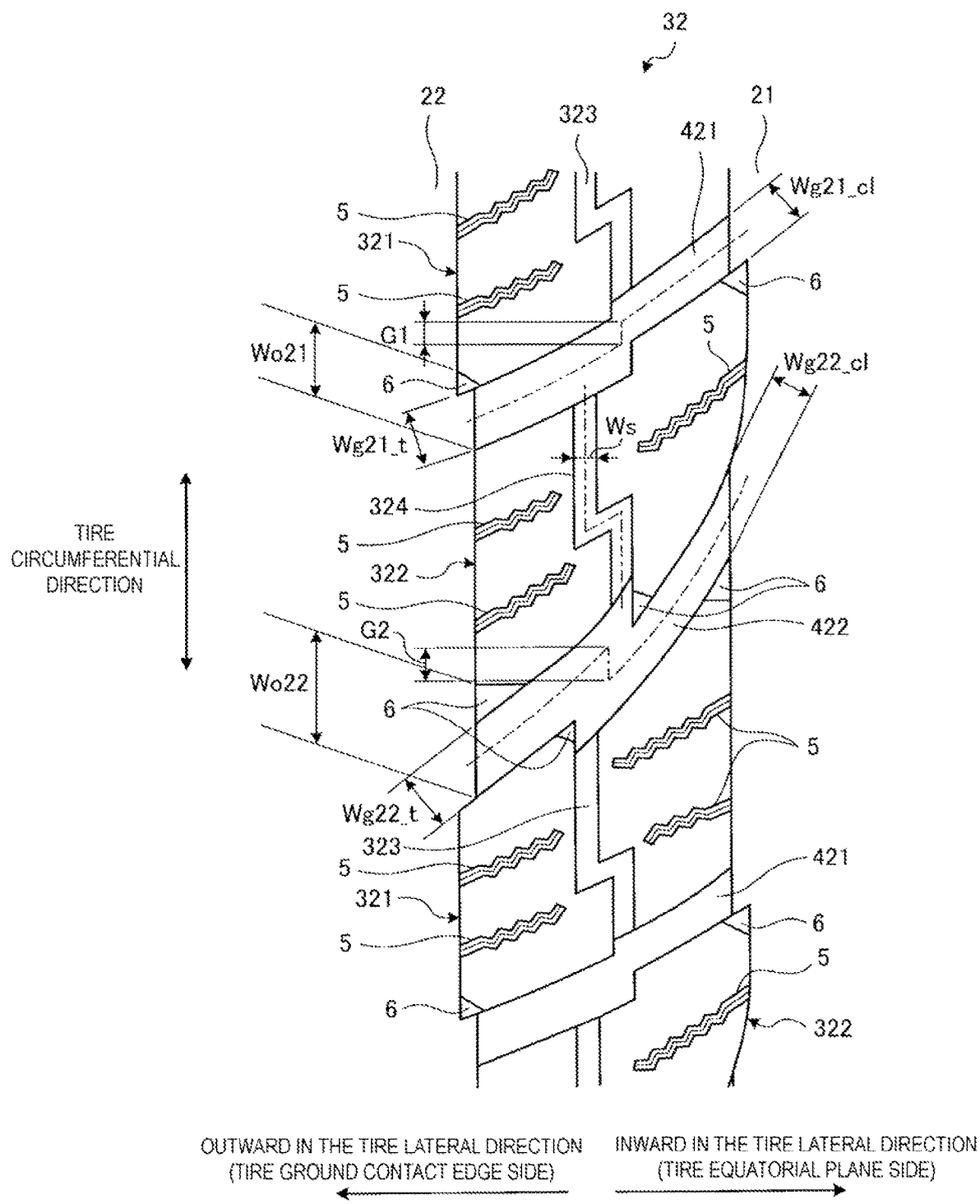
FIG. 5 is an explanatory diagram illustrating a modified example of the second land portion illustrated in FIG. 4.

FIG. 3 is an enlarged view illustrating the main portion of the tread pattern illustrated in FIG. 2. FIG. 3 illustrates an enlarged plan view of the contact patch of the shoulder land portion and the center land portion in the half region of the tire. FIG. 4 is an enlarged view illustrating the second land portion of the tread pattern illustrated in FIG. 2. FIG. 5 is an explanatory diagram illustrating a modified example of the second land portion illustrated in FIG. 4. These drawings each illustrate an enlarged plan view of a single land portion.

As illustrated in FIG. 2, the second land portions 32 each include a plurality of types of through lug grooves 421, 422 that extend through the second land portion 32 in the tire lateral direction. The plurality of types of through lug grooves 421, 422 are periodically arranged in the tire circumferential direction. Additionally, the second land portions 32 are each divided in the tire circumferential direction by the through lug grooves 421, 422, forming a single block row of a plurality of types of blocks 321, 322. The plurality of types of blocks 321, 322 have different shapes. Additionally, a plurality of sets of block units formed by a set of the plurality of types of blocks 321, 322 are repeatedly arranged across the entire circumference of the tire.

The number of types of the through lug grooves and the block described above is set within a range of from 2 to 3, inclusive.

Furthermore, the pneumatic tire 1 includes a variable pitch structure formed by a change in a pitch array in the tire circumferential direction across the tread pattern as a whole, and circumferential lengths of the blocks of the land portions 31 to 33 periodically change in the tire circumferential direction. Thus, in the second land portion 32, the circumferential lengths of the blocks 321, 322 that form a set of the plurality of types described above periodically change in the tire circumferential direction by the variable pitch structure described above. Accordingly, pattern noise generated during rolling is reduced, improving the noise performance (particularly interior noise performance) of the tire.

Additionally, as illustrated in FIG. 3, crossing angles $\varphi 21$, $\varphi 22$ of the first through lug groove 421 and the second through lug groove 422, adjacent to each other in the tire circumferential direction, with respect to the outermost circumferential main groove 22 are mutually different. Specifically, the first through lug groove 421 and the second through lug groove 422 intersect the outermost circumferential main groove 22 from the same tire circumferential direction at crossing angles having absolute values that are mutually different. The crossing angle $\varphi 21$ of the first through lug groove 421 is greater than the crossing angle $\varphi 22$ of the second through lug groove 422. Additionally, these crossing angles $\varphi 21$, $\varphi 22$ preferably have a relationship such that 10 degrees $\leq \varphi 21 - \varphi 22 \leq 50$ degrees, and more preferably have a relationship such that 20 degrees $\leq \varphi 21 - \varphi 22 \leq 40$ degrees.

The crossing angles $\varphi 21$, $\varphi 22$ of the through lug grooves are each defined as the crossing angle of the groove center line of the outermost circumferential main groove and the extension line of the through lug groove, and are measured in an unloaded state with the tire mounted on the specified rim and the specified internal pressure applied. Note that the crossing angles of the through lug grooves may differ with respect to the inclination angle of the through lug groove as a whole described below. For example, a configuration in which the through lug groove in its entirety bends or curves (see FIG. 4) and a configuration in which the through lug groove partially bends at the opening portion to the outermost circumferential main groove may be utilized (not illustrated).

In such a configuration, the through lug grooves 421, 422 adjacent to the second land portion 32 open to the outermost circumferential main groove 22 at the different crossing angles $\varphi 21$, $\varphi 22$, thereby promoting the discharge of snow that entered a communicating portion between the through lug grooves 421, 422 and the outermost circumferential main groove 22 upon movement of the blocks 321, 322 during travel on snowy road surfaces. In this way, the snow performance (particularly steering stability and startability) of the tire is improved. Additionally, mud performance during travel on sludge, sand, and the like is improved by a similar action.

Additionally, as illustrated in FIG. 4, opening widths Wo21, Wo22 of the first through lug groove 421 and the second through lug groove 422 with respect to the outermost circumferential main groove 22 are mutually different. Thus, the through lug grooves 421, 422 having the different opening widths Wo21, Wo22 are alternately arranged in the tire circumferential direction. In this way, snow discharge properties on snowy road surfaces are improved.

The opening widths Wo21, Wo22 of the through lug grooves are each an opening width in a tread contact surface of a groove opening portion of the through lug groove with respect to the outermost circumferential main groove, and are measured as widths including notch portions and chamfered portions formed in the groove opening portions of the through lug grooves.

The opening width Wo21 with respect to the outermost circumferential main groove 22 of the first through lug groove 421 having the crossing angle $\varphi 21$ that is large is preferably less than the opening width Wo22 with respect to the outermost circumferential main groove 22 of the second through lug groove 422 having the crossing angle $\varphi 22$ that is small. In other words, the first through lug groove 421 having the larger crossing angle $\varphi 21$ opens to the outermost circumferential main groove 22 at the smaller opening width Wo21 (<Wo22). In this way, the traction characteristics (snow column shear force) of the first through lug groove 421 having the large crossing angle $\varphi 21$ is ensured.

For example, in the configuration of FIG. 4, the second land portions 32 each include chamfered portions 6 on one side of the groove opening portions on the outermost circumferential main groove 22 side of the through lug grooves 421, 422. The size of the chamfered portions 6 formed in the opening portion of the first through lug groove 421 is smaller than that of the chamfered portion 6 formed in the opening portion of the second through lug groove 422. In this way, the opening width Wo21 of the first through lug groove 421 is relatively small.

Further, in the configuration of FIG. 4, the second land portions 32 respectively include the two types of through lug grooves 421, 422, and the two types of blocks 321, 322 defined by these through lug grooves 421, 422. A plurality of sets of block units formed by the two types of blocks 321, 322 are repeatedly arranged across the entire circumference of the tire (see FIG. 2). The two types of blocks 321, 322 have different shapes, and are alternately arranged in the tire circumferential direction.

Additionally, the through lug grooves 421, 422 of the second land portions 32 each incline as a whole at a predetermined inclination angle (dimension symbol omitted in the drawing) with respect to the tire lateral direction. The absolute values of the inclination angles of the through lug grooves 421, 422 are preferably within a range of from 5 to 7 degrees, inclusive, and more preferably within a range of from 20 to 48 degrees, inclusive.

Additionally, the inclination angle of the first through lug groove 421 as a whole with respect to the tire lateral direction, and the inclination of the second through lug groove 422 as a whole with respect to the tire lateral direction are mutually different. As a result, the two types of through lug grooves 421, 422 adjacent in the tire circumferential direction have the inclination angles θ21, θ22 (dimension symbol omitted in the drawing) that are mutually different. Additionally, the two types of through lug grooves 421, 422 incline in the same direction (upward toward the tire equatorial plane CL in FIG. 4) with respect to the tire lateral direction, and the inclination angle θ21 of the through lug groove 421 is less than the inclination angle θ22 of the through lug groove 422 (θ22>θ21). At this time, the difference between the inclination angles θ21, θ22 is preferably within a range of 5 degrees≤θ22−θ21≤40 degrees, and more preferably within a range of 10 degrees≤θ22−θ21≤20 degrees. In this way, the difference θ22−θ21 between the inclination angles is made appropriate.

The inclination angles of the through lug grooves are each measured as an angle formed by the tire rotation axis and an imaginary line connecting the center points of the opening portions of the through lug groove to the left and right circumferential main grooves. Additionally, the inclination angles of the through lug grooves of the shoulder land portions are each measured as an angle formed by the tire rotation axis and an imaginary line connecting the center points of the opening portions of the through lug groove to the outermost circumferential main groove and the tire ground contact edge.

Additionally, the blocks 321, 322 adjacent in the tire circumferential direction have different shapes. Specifically, the left and right edge portions on the circumferential main groove 21, 22 sides of the blocks 321, 322 have different circumferential lengths. The one adjacent block 321 has a long edge portion on the tire equatorial plane CL side in the tire circumferential direction and a short edge portion on the tire ground contact edge T side in the tire circumferential direction. Conversely, the other block 322 has a short edge portion on the tire equatorial plane CL side in the tire circumferential direction and a long edge portion on the tire ground contact edge T side in the tire circumferential direction. Thus, when attention is focused on the edge portions on one side of the second land portion 32, long edge portions and short edge portions are alternately disposed in the tire circumferential direction. Additionally, in the left and right circumferential main grooves 21, 22, the edge portions of the adjacent blocks 321, 322 are disposed mutually offset in the tire lateral direction so that the short edge portion protrudes further on the circumferential main groove 21, 22 side than the long edge portion.

Additionally, as illustrated in FIG. 4, the two types of blocks 321, 322 of the second land portion 32 include one of the circumferential narrow groove 323, 324, respectively. The circumferential narrow grooves 323, 324 each have a bent shape that oscillates in the tire lateral direction, and respectively extend through the blocks 321, 322 in the tire circumferential direction and open to the through lug grooves 421, 422. In this way, the blocks 321, 322 are divided in the tire lateral direction, and the ground contact patch pressure in the blocks 321, 322 is made uniform when the tire comes into contact with the ground. Also, the circumferential narrow grooves 323, 324 each have a bent shape, thereby increasing the edge component of the second land portion 32 and improving the snow performance of the tire.

Additionally, the circumferential narrow grooves 323, 324 are disposed in central regions (regions corresponding to ⅓ of the block width) of the blocks 321, 322 in the tire lateral direction, and the road contact surface of each of the blocks 321, 322 is substantially equally divided into two in the tire lateral direction. The circumferential narrow grooves 323, 324 include bent portions having a step-like shape that oscillates in the tire lateral direction. The bent portions of the circumferential narrow grooves 323, 324 are disposed in the central portions of the blocks 321, 322 in the tire circumferential direction (central portions when the blocks 321, 322 are equally divided into three in the tire circumferential direction). In this way, the rigidity of the blocks 321, 322 in the tire circumferential direction is made uniform.

The bent portions of the circumferential narrow grooves 323, 324 preferably incline with respect to the tire circumferential direction within a range of from 50 to 70 degrees, inclusive, and more preferably within a range of from 55 to 65 degrees, inclusive.

Additionally, a groove width Ws of the circumferential narrow grooves 323, 324 is set so that the circumferential narrow grooves 323, 324 are not blocked at the contact surface between the tire and a flat plate when the tire is mounted on a specified rim, inflated to the specified internal pressure, placed vertically on the flat plate in a static state, and loaded with a load corresponding to the specified load. Specifically, the groove width Ws of the circumferential narrow grooves 323, 324 is set within a range of 1.5 mm≤Ws≤6.0 mm. In this way, the circumferential narrow grooves 323, 324 appropriately open when the tire comes into contact with the ground, dividing the blocks 321, 322 and appropriately making the ground contact patch pressure of the blocks 321, 322 uniform. At the same time, the edge components of the blocks 321, 322 are ensured by the circumferential narrow grooves 323, 324, improving the traction characteristics of the tire.

The width Ws of the circumferential narrow grooves 323, 324 is measured as the distance between opposing opening portions of the groove wall surface when the tire is mounted on a specified rim, inflated to the specified internal pressure, and in an unloaded state.

Additionally, the circumferential narrow grooves 323, 324 adjacent in the tire circumferential direction open to the common through lug grooves 421, 422 at different positions. That is, the opening portions of the circumferential narrow grooves 323, 324 facing each other with the through lug grooves 421, 422 therebetween are disposed shifted in position in the tire lateral direction. Thus, the opening portions of the circumferential narrow grooves 323, 324 adjacent to each other are dispersed in the tire lateral direction. Accordingly, the rigidity of each of the second land portion 32 as a whole is made uniform.

Note that, while the circumferential narrow grooves 323, 324 in the configuration of FIG. 4 are provided with the bent portions having a step-like shape as described above, no such limitation is intended and the circumferential narrow grooves 323, 324 may have a straight shape, an arc shape, or a wave-like shape (not illustrated).

Additionally, as illustrated in FIG. 4, the through lug grooves 421, 422 each have a shape obtained by increasing the groove width toward the tire ground contact edge T (see FIG. 2) side. Groove widths $Wg21\_cl$, $Wg22\_cl$ of the opening portions of the through lug grooves 421, 422 on the tire equatorial plane CL side are less than groove widths $Wg21\_t$, $Wg22\_t$ of the opening portions on the tire ground contact edge T side. Accordingly, the rigidity of the regions of the blocks 321, 322 of the second land portion 32 on the tire equatorial plane CL side is ensured, thereby suppressing uneven wear of the blocks 321, 322. Additionally, in the through lug grooves 421, 422 adjacent in the tire circumferential direction, the groove widths $Wg21\_cl$, $Wg22\_cl$ of the opening portions on the tire equatorial plane CL side are equal ($Wg21\_cl=Wg22\_cl$), and the groove widths $Wg21\_t$, $Wg22\_t$ of the opening portions on the tire ground contact edge T side are equal ($Wg21\_t=Wg22\_t$). Note that these groove widths may be mutually different as well (not illustrated).

Note that the groove widths of the through lug grooves may be selected as appropriate depending on the tire size. In a tire for a general all-season passenger vehicle and a tire for a light truck, the groove width of the through lug grooves disposed in the second land portion is within a range of from 2 to 10 mm, inclusive.

Additionally, in the configuration of FIG. 4, one groove wall of each of the through lug grooves 421, 422 of the second land portion 32 includes a bent portion having a step-like shape when the tread is seen in a plan view, and the other groove wall has a linear shape or an arc shape. In this way, differences between the groove widths $Wg21\_cl$, $Wg21\_t$ and $Wg22\_cl$, $WG22\_t$ of the left and right opening portions of the through lug grooves 421, 422 are formed. Additionally, the groove walls of the through lug grooves 421, 422 each include the bent portion having a step-like shape, thereby increasing the edge components of the through lug grooves 421, 422 and enhancing traction characteristics.

The bent portions having a step-like shape are each defined by a first groove wall portion, a second groove wall portion disposed offset from the first groove wall portion in the tire circumferential direction, and a circumferential groove wall portion extending in the tire circumferential direction and connected to the first groove wall portion and the second groove wall portion. Additionally, an angle formed by the wall surface of the circumferential groove wall portion and the tire circumferential direction (dimension symbol omitted in the drawing) is preferably within a range of from 80 to 100 degrees, inclusive, and more preferably within a range of from 85 to 95 degrees, inclusive.

Additionally, one groove wall of each of the through lug grooves 421, 422 bends at the central portion of the second land portion 32, and thus the left and right groove center lines of the bent portions are offset in the tire circumferential direction at the central portion of the second land portion 32. At this time, offset amounts G1, G2 of the groove center lines of the through lug grooves 421, 422 in the tire circumferential direction are within a range from 2.0 to 12.0 mm, inclusive.

Additionally, the bending directions of the groove center lines of the through lug grooves 421, 422 adjacent to each other are opposite directions with respect to the tire circumferential direction. As a result, the edge portions of the block 322 sandwiched by the bent portions of the adjacent through lug grooves 421, 422 increase in width on the tire equatorial plane CL side and decrease in width on the tire ground contact edge T side. In this way, the length in the tire circumferential direction of the portion of the block 322 that decreases in width due to the difference in the inclination angles of the through lug grooves 421, 422 (the portion of the block 322 on the tire equatorial plane CL side divided by the circumferential narrow groove 324) is appropriately ensured.

Note that, in the configuration of FIG. 4, as described above, one groove wall of each of the through lug grooves 421, 422 of the second land portion 32 includes the bent portion having a step-like shape when the tread is seen in a plan view, and the other groove wall has a linear shape or an arc shape. However, no such limitation is intended and, as illustrated in the modified example of FIG. 5, the left and right groove walls of each of the through lug grooves 421, 422 of the second land portion 32 may include the bent portion having a step-like shape when the tread is seen in a plan view.

Shoulder Land Portions

Figure 6:
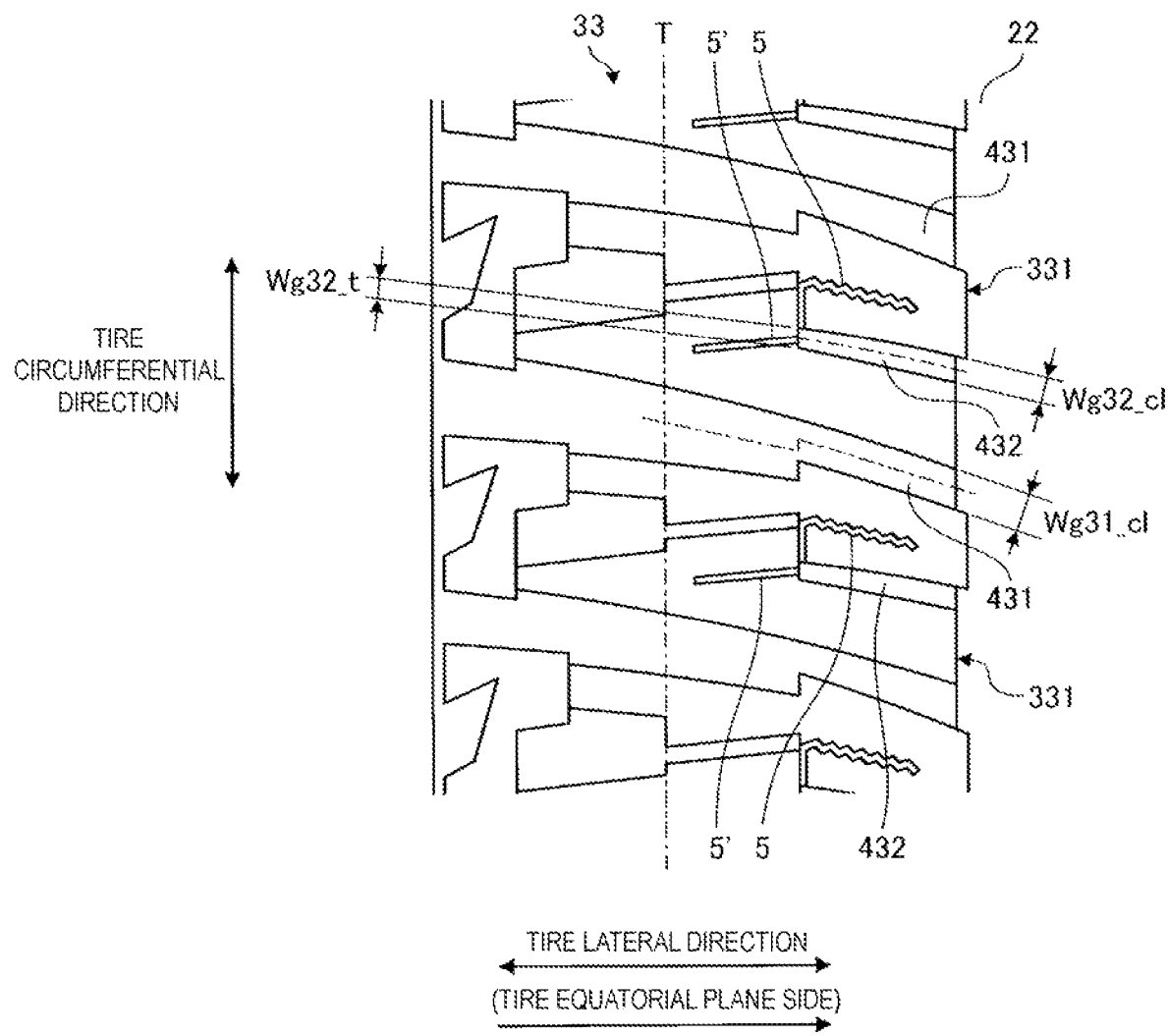
FIG. 6 is an enlarged view illustrating a shoulder land portion of the tread pattern illustrated in FIG. 2.

FIG. 6 is an enlarged view illustrating the shoulder land portion of the tread pattern illustrated in FIG. 2.

As described above, the shoulder land portions 33 each include a plurality of through lug grooves 431 that extend through the shoulder land portion 33 in the tire lateral direction (see FIG. 2). Additionally, as illustrated in FIG. 6, the shoulder land portions 33 each include a plurality of blocks 331 defined by the through lug grooves 431 adjacent to each other.

The through lug grooves 431 each extend through the shoulder land portion 33 in the tire lateral direction and open to the circumferential main groove 22 and the tire ground contact edge T. For example, in the configuration of FIG. 3, the through lug grooves 431 each have a shape obtained by increasing the groove width from the circumferential main groove 22 toward the tire ground contact edge T. Specifically, one groove wall of each of the through lug groove 431 includes the bent portion having a step-like shape when the tread is seen in a plan view, and the other groove wall has a linear shape or an arc shape. However, no such limitation is intended, and the left and right groove walls of the through lug groove 431 may have a linear shape or an arc shape. Additionally, the groove depth of a narrow width portion on the circumferential main groove 22 side of the through lug groove 431 is preferably within a range of from 30 to 80%, inclusive, with respect to the groove depth of a broad width portion on the tire ground contact edge T side. In this way, the snow discharge effect and noise reduction effect of the through lug groove 431 are ensured.

The block 331 is defined by the through lug grooves 431, 431 adjacent to each other and the outermost circumferential main grooves 22, and is disposed on the tire ground contact edge T. Additionally, the plurality of blocks 331 are disposed in the tire circumferential direction, forming one block row. Each of the blocks 331 includes one non-through lug groove 432 described below.

As illustrated in FIG. 3, the first through lug groove 421 and the second through lug groove 422 of the second land portion 32, and the through lug grooves 431 of the shoulder land portion 33 open to positions of the outermost circumferential main groove 22 that differ in the tire circumferential direction. Thus, the blocks 321, 322 of the second land portion 32 and the block 331 of the shoulder land portion 33 are arranged in a staggered manner in the tire circumferential direction, sandwiching the outermost circumferential main groove 22. In such a configuration, snow that has entered between the blocks 321, 322 of the second land portion 32 and the block 331 of the shoulder land portion 33 is pressed together during travel on snowy road surfaces, thereby improving traction characteristics on snowy road surfaces and improving the snow performance (particularly startability) of the tire.

Further, in the configuration described above, a distance L1 in the tire circumferential direction between the opening portions with respect to the outermost circumferential main groove 22 of the adjacent through lug grooves 421, 422 of the second land portion 32, and a minimum distance L2 in the tire circumferential direction from the opening portions with respect to the outermost circumferential main groove 22 of the adjacent through lug grooves 421, 422 of the second land portion 32 and the opening portion with respect to the outermost circumferential main groove 22 of the through lug groove 431 of the shoulder land portion 33 is preferably within a range of $0.40 \leq L2/L1 \leq 0.50$. In this way, the distance L2 of the through lug groove 431 of the shoulder land portion 33 is appropriately ensured.

The distances L1, L2 of the through lug grooves are each measured using the center points of the groove widths of the through lug grooves 421, 422, 431 with respect to the outermost circumferential main groove 22 as measurement points.

Additionally, as illustrated in FIGS. 2 and 3, the first through lug groove 421 and the second through lug groove 422 of the second land portion 32, and the through lug groove 431 of the shoulder land portion 33 incline in opposite directions in the tire lateral direction. Additionally, the through lug grooves 421, 422 in the left and right second land portions 32, 32 incline in the same direction. In this way, the traction characteristics on snowy road surfaces during vehicle turning improve, thereby improving the snow performance (particularly turning performance) of the tire.

For example, in the configuration of FIG. 2, the five land portions 31 to 33 respectively include the plurality of lug grooves 411, 412, 421, 422, 431 inclined at a predetermined inclination angle in the tire lateral direction. The through lug grooves 411, 412, 431 of the center land portion 31 and the left and right shoulder land portions 33, 33, and the through lug grooves 421, 422 of the left and right second land portions 32, 32 are inclined in opposite directions in the tire lateral direction. The through lug grooves 411, 412 of the center land portion 31 and the through lug grooves 431 of the shoulder land portion 33 are inclined in the same direction, and the through lug grooves 421, 422 of the left and right second land portions 32, 32 are inclined in the same direction. Additionally, the orientation of the through lug grooves of the adjacent land portions 31, 32; 32, 33 are reversed. Accordingly, in the tread pattern as a whole, the through lug grooves 411, 412, 421, 422, 431 are arranged in a zigzag shape in the tire lateral direction. In this way, the traction characteristics on snowy road surfaces during vehicle turning are further improved.

Additionally, as illustrated in FIG. 2, the positions of the opening portions with respect to the circumferential main grooves 21, 22 of the through lug grooves 411, 412, 421, 422; 421, 422, 431 of the adjacent land portions 31, 32; 32, 33 are disposed mutually offset in the tire circumferential direction. Thus, the through lug grooves 411, 412, 421, 422; 421, 422, 431 of the adjacent land portions 31, 31; 32, 33 are discontinuously disposed on the extension lines of the groove center lines. In this way, the traction characteristics on snowy road surfaces are further improved.

Additionally, each of the blocks 331 of the shoulder land portions 33 includes one non-through lug groove 432, as illustrated in FIGS. 3 and 6.

The non-through lug groove 432, as illustrated in FIG. 6, opens to the circumferential main groove 22 at one end portion, and terminates in the contact patch of the shoulder land portion 33 at the other end portion. The one non-through lug groove 432 is disposed between the through lug grooves 431, 431 adjacent to each other. Additionally, a maximum groove depth of the non-through lug groove 432 is less than a maximum groove depth of the through lug groove 431. Further, the non-through lug groove 432 has a shape obtained by gradually decreasing the groove width from the circumferential main groove 22 toward the tire ground contact edge T side. Additionally, a groove width $Wg32\_cl$ of the end portion of the non-through lug groove 432 on the circumferential main groove 22 side and a groove width $Wg32\_t$ of the end portion on the tire ground contact edge T side preferably have a relationship such that $1.10 \leq Wg32\_cl/Wg32\_t \leq 1.30$. In this way, the snow discharge properties of the non-through lug groove 432 are improved.

Additionally, as illustrated in FIG. 3, the through lug grooves 421, 422 of the second land portion 32, and the non-through lug groove 432 of the shoulder land portion 33 open to the same position with respect to the outermost circumferential main groove 22 in the tire circumferential direction. Thus, the opening portions of the non-through lug grooves 432 of the shoulder land portion 33 are disposed substantially facing the opening portions of the through lug grooves 421, 422 of the second land portion 32. During travel on snowy road surfaces, as described above, snow that has entered between the blocks 321, 322 of the second land portion 32 and the blocks 331 of the shoulder land portion 33 is pressed together. Then, the blocks 331 of the shoulder land portion 33 each include the non-through lug groove 432, thereby causing the blocks 331 of the shoulder land portion 33 to readily deform during rolling. This promotes the discharge of the snow held in the outermost circumferential main grooves 22.

Further, in the configuration described above, the distance L1 in the tire circumferential direction between the opening portions with respect to the outermost circumferential main groove 22 of the adjacent through lug grooves 421, 422 of the second land portion 32, and a minimum distance L3 in the tire circumferential direction from the opening portions with respect to the outermost circumferential main groove 22 of the adjacent through lug grooves 421, 422 of the second land portion 32 to the opening portion with respect to the outermost circumferential main groove 22 of the non-through lug groove 432 of the shoulder land portion 33 is preferably within a range of $0 \leq L3/L1 \leq 5.0$. In this way, the positions of the opening portions of the non-through lug grooves 432 of the shoulder land portion 33 is made appropriate.

Additionally, a groove width $Wg31\_cl$ of the opening portion with respect to the circumferential main groove 22 of the through lug groove 431 and a groove width $Wg32\_cl$ of the opening portion with respect to the circumferential main groove 22 of the non-through lug groove 432 have a relationship such that $Wg32\_cl < Wg31\_cl$. Additionally, a ratio Wg31_cl/Wg32_cl is preferably within a range of 1.3≤Wg31_cl/Wg32_cl≤2.0, and more preferably within a range of 1.6≤Wg31_cl/Wg32_cl≤1.8. In this way, the snow discharge properties of the non-through lug groove 432 are appropriately ensured.

Figure 7:
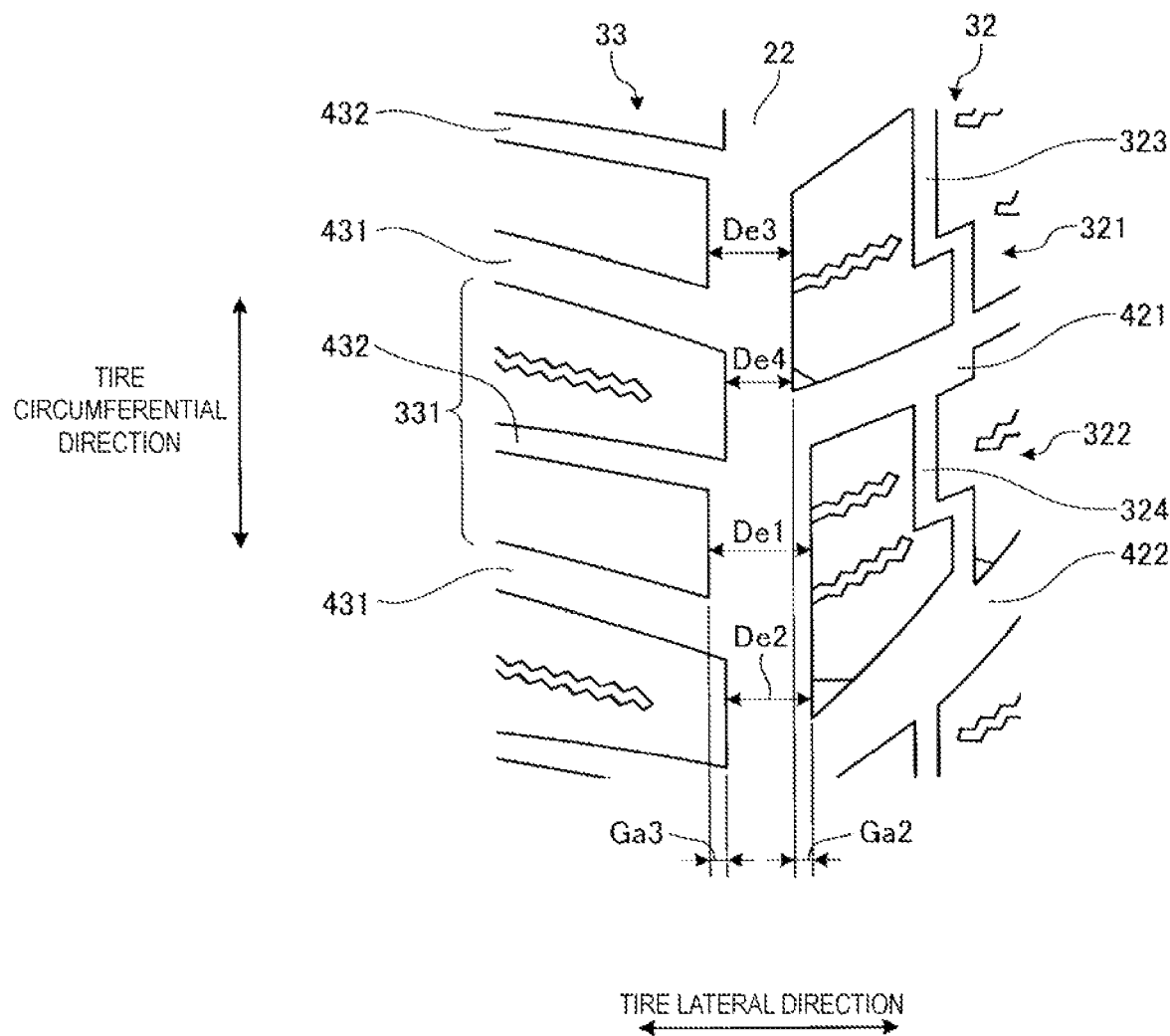
FIG. 7 is an enlarged view illustrating the second land portion and the shoulder land portion illustrated in FIG. 3.

FIG. 7 is an enlarged view illustrating the second land portion and the shoulder land portion illustrated in FIG. 3. FIG. 7 illustrates the interrelationship between the edge portion of the second land portion 32 and the edge portion of the shoulder land portion 33 in the outermost circumferential main groove 22.

According to the configuration of FIG. 3, the two types of blocks 321, 322 of the second land portion 32 adjacent to each other in the tire circumferential direction are disposed so that the edge portions on the outermost circumferential main groove 22 side are mutually offset in the tire lateral direction, as illustrated in FIG. 4. Thus, the groove wall of the outermost circumferential main groove 22 on the second land portion 32 side has a shape that is step-like in the tire lateral direction at the groove opening portions.

Additionally, as illustrated in FIG. 6, in the shoulder land portion 33 as well, the pair of edge portions of the block 331 defined by the non-through lug groove 432 on the outermost circumferential main groove 22 side are disposed mutually offset in the tire lateral direction. Thus, the groove wall of the outermost circumferential main groove 22 on the shoulder land portion 33 side has a shape that is step-like in the tire lateral direction at the groove opening portions.

Additionally, as illustrated in FIG. 3, the through lug grooves 421, 422 of the second land portion 32 and the through lug groove 431 of the shoulder land portion 33 open to the outermost circumferential main groove 22 at different positions in the tire circumferential direction. Thus, the blocks 321, 322 of the second land portion 32 and the block 331 of the shoulder land portion 33 are arranged in a staggered manner in the tire circumferential direction, sandwiching the outermost circumferential main groove 22. Thus, the block row of the second land portion 32 and the block row of the shoulder land portion 33 are arranged with the phases shifted in the tire circumferential direction.

In such a configuration, as illustrated in FIG. 7, an offset amount Ga2 of the edge portions of the two types of blocks 321, 322 of the second land portion 32 and an offset amount Ga3 of the edge portions of the block 331 of the shoulder land portion 33 cause a distance De in the tire lateral direction of the opposing end portions of the left and right land portions 32, 33 sandwiching the outermost circumferential main groove 22 to form a step-like shape in the tire circumferential direction. Additionally, at least three or more types of distances De1 to De4 are formed. In this way, the snow discharge properties of the outermost circumferential main groove 22 during travel on snowy road surfaces are improved.

For example, in the configuration of FIG. 7, (1) the distance De1 (De_max) between the edge portion of the block 322 of the second land portion 32 recessed with respect to the outermost circumferential main groove 22, and one edge portion of the block 331 of the shoulder land portion 33 recessed with respect to the outermost circumferential main groove 22, (a) the distance De2 between the edge portion of the block 322 of the second land portion 32 recessed with respect to the outermost circumferential main groove 22, and the other edge portion of the block 331 of the shoulder land portion 33 projecting toward the outermost circumferential main groove 22, (3) the distance De3 between the edge portion of the block 321 of the second land portion 32 projecting toward the outermost circumferential main groove 22, and the one edge portion of the block 331 of the shoulder land portion 33 recessed with respect to the outermost circumferential main groove 22, and (4) the distance De4 (De_min) between the edge portion of the block 321 of the second land portion 32 projecting toward the outermost circumferential main groove 33 and the other edge portion of the block 331 of the shoulder land portion 33 projecting toward the outermost circumferential main groove 22 are formed.

Additionally, in FIG. 7, the maximum value De_max and the minimum value De_min of the distance De preferably have a relationship such that 1.20≤De_max/De_min≤1.80, and more preferably have a relationship such that 1.50≤De_max/De_min≤1.70. In this way, the distance De in the tire lateral direction between the opposing edge portions of the left and right land portions 32, 33 sandwiching the outermost circumferential main groove 22 is made appropriate.

Additionally, in FIG. 7, the offset amount Ga2 of the edge portions of the two types of blocks 321, 322 of the second land portion 32 and the offset amount Ga3 of the edge portions of the block 331 of the shoulder land portion 33 are preferably substantially the same. Specifically, a ratio Ga2/Ga3 is set within a range of 0.8≤Ga2/Ga3≤1.2. In this way, the offset amounts Ga2, Ga3 of the edge portions of the left and right land portions 32, 33 of the outermost circumferential main groove 22 are made uniform, thereby suppressing uneven wear of the edge portions of the left and right land portions 32, 33.

Sipes

As illustrated in FIG. 2 and FIGS. 4 to 6, the land portions 31 to 33 each include a plurality of sipes 5. These sipes 5 are classified into two-dimensional sipes (so-called planar sipes) and three-dimensional sipes (so-called 3D sipes). With the sipes 5, the edge components of the land portions 31 to 33 are ensured and the traction characteristics of the tire are improved.

The two-dimensional sipe includes a sipe wall surface having a straight shape when viewed in a discretionary cross section with the sipe length direction set as the normal line direction (when viewed in a cross section that includes the sipe width direction and the sipe depth direction). The two-dimensional sipe need only have a straight shape when viewed in a cross section as described above, and may extend in a straight shape, a zigzag shape, a wave-like shape, an arc shape, or the like in the sipe length direction.

The three-dimensional sipe includes a sipe wall surface having a bent shape oscillating in the sipe width direction when viewed in both a cross section with the sipe length direction set as the normal line direction and in a cross section with the sipe depth direction set as the normal line direction. Compared to the two-dimensional sipes, the three-dimensional sipes have a greater meshing force between opposing sipe wall surfaces and therefore act to reinforce the rigidity of the land portions. The three-dimensional sipe need only have the structure described above in the sipe wall surface, and may have, for example, a straight shape, a zigzag shape, a wave-like shape, an arc shape, or the like on the tread contact surface. The following examples may be considered as the aforementioned three-dimensional sipes (see FIGS. 8 and 9).

Figure 8:
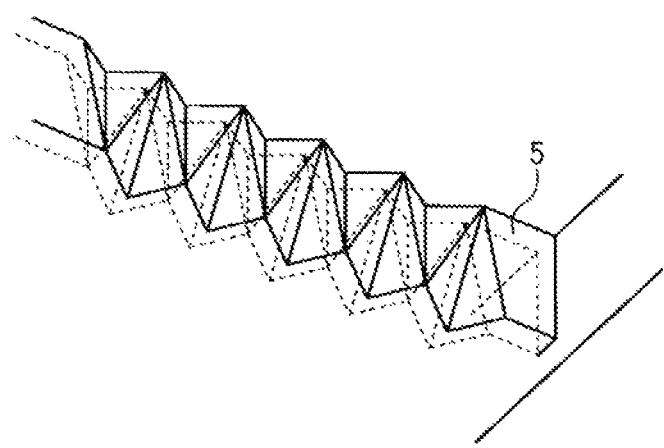
FIG. 8 is an explanatory diagram illustrating an example of a three-dimensional sipe.
Figure 9:
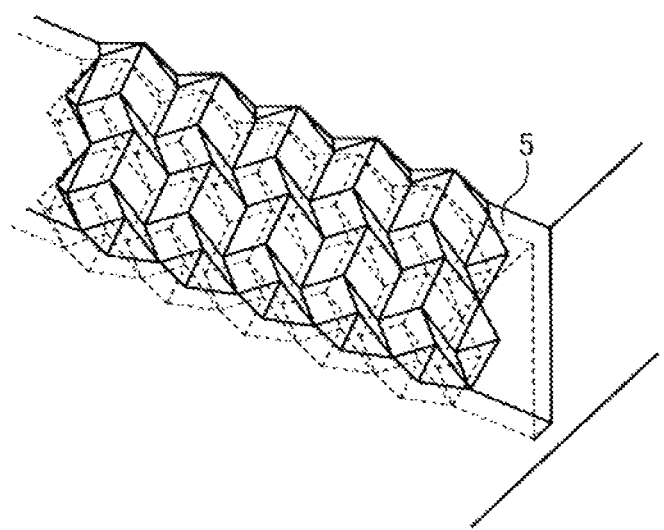
FIG. 9 is an explanatory diagram illustrating an example of a three-dimensional sipe.

FIGS. 8 and 9 are explanatory diagrams illustrating examples of the three-dimensional sipe. These drawings are transparent perspective views of a three-dimensional sipe including a pyramid-type sipe wall surface.

In the configuration of FIG. 8, the sipe wall surfaces have a structure in which triangular pyramids and inverted triangular pyramids are connected in the sipe length direction. In other words, the sipe wall surfaces have a zigzag shape on the tread surface side and a zigzag shape on the bottom portion side that shift in pitch in the tire lateral direction, and have opposing protrusions and recesses between the zigzag shapes on the tread surface side and the bottom portion side. Additionally, with these protrusions and recesses, when viewed in a tire rotating direction, the sipe wall surface is formed by connecting a protrusion inflection point on the tread surface side to a recess inflection point on the bottom portion side, a recess inflection point on the tread surface side to a protrusion inflection point on the bottom portion side, and protrusion inflection points mutually adjacent to the protrusion inflection point on the tread surface side and the protrusion inflection point on the bottom portion side with ridge lines; and by connecting these ridge lines with consecutive planes in the tire width direction. Additionally, a first sipe wall surface has an uneven surface with convex triangular pyramids and inverted triangular pyramids arranged alternating in the tire lateral direction; and a second sipe wall surface has an uneven surface with concave triangular pyramids and inverted triangular pyramids arranged alternating in the tire lateral direction. Furthermore, the uneven surface of the sipe wall surface is oriented toward outside the blocks at at least the outer ends of the sipe. Note that examples of such a three-dimensional sipe include the technology described in Japan Patent No. 3894743 B.

Additionally, in the configuration of FIG. 9, the sipe wall surfaces have a structure in which a plurality of prism shapes having a block form are connected in the sipe depth direction and the sipe length direction while inclining with respect to the sipe depth direction. In other words, the sipe wall surface has a zigzag shape at the tread surface. Additionally, the sipe wall surface has bent portions in at least two locations in the tire radial direction in the blocks that bend in the tire circumferential direction and are connected in the tire lateral direction. Moreover, these bent portions have a zigzag shape with amplitude in the tire radial direction. Additionally, while, in the sipe wall surface, the amplitude is constant in the tire circumferential direction, an inclination angle in the tire circumferential direction with respect to a normal line direction of the tread surface is smaller at a portion on the sipe bottom side than at a portion on the tread surface side; and the amplitude in the tire radial direction of the bent portion is greater at a portion on the sipe bottom side than at a portion on the tread surface side. Note that examples of such a three-dimensional sipe include the technology described in Japan Patent No. 4316452 B.

For example, in the configuration of FIG. 4, the blocks 321, 322 of the second land portion 32 each include the plurality of sipes 5, and these sipes 5 are all three-dimensional sipes. Additionally, the sipes 5 terminate inside the blocks 321, 322 at one end portion, and open to the edge portion of the block 32 at the other end portion, communicating to the circumferential main grooves 21, 22. The sipes 5 extend in the tire lateral direction while inclining in the same direction as the through lug grooves 421, 422 with respect to the tire circumferential direction. Additionally, the sipes 5 and the through lug grooves 421, 422 are disposed equally spaced apart and in parallel in the tire circumferential direction, and thus the blocks 321, 322 are defined in regions having a rectangular shape and substantially the same width.

Additionally, the two types of through lug grooves 421, 422 of the second land portion 32 have different inclination angles, and thus the road contact surface of a portion of the blocks 322 is relatively small in the region on the tire equatorial plane CL side defined by the circumferential narrow groove 323. Thus, the number of sipes in this region is set less than the number of sipes in other regions. In this way, a sipe density of the road contact surface of each of the blocks 321, 322 is made uniform.

Additionally, as illustrated in FIG. 6, each of the blocks 331 of the shoulder land portion 33 includes a plurality of sipes 5, 5'. The sipe 5 disposed side by side with the non-through lug groove 432 is a three-dimensional sipe, and the sipe 5' disposed with the non-through lug groove 432 extending in the groove length direction is a two-dimensional sipe. These sipes 5, 5' do not open to the circumferential main groove 22 or the tire ground contact edge T, and include a terminating end portion inside the block 331. Additionally, the through lug groove 431 defining the block 331, the non-through lug groove 432 inside the block 331, and the three-dimensional sipe 5 are disposed equally spaced apart and in parallel in the tire circumferential direction, and thus the blocks 331 are defined in regions having a rectangular shape and substantially the same width.

Effects

As described above, the pneumatic tire 1 includes four or more circumferential main grooves 21, 22 extending in the tire circumferential direction and five or more rows of land portions 31 to 33 defined by the circumferential main grooves 21, 22 (see FIG. 2). Additionally, the second land portions 32 each include the first through lug grooves 421 and the second through lug grooves 422 that extend through the second land portion 32 in the tire lateral direction and are adjacently arranged in the tire circumferential direction. Additionally, crossing angles φ21, φ22 of the first through lug groove 421 and the second through lug groove 422 with respect to the outermost circumferential main groove 22 are mutually different (see FIG. 3).

In such a configuration, the through lug grooves 421, 422 of the second land portion 32 that are mutually adjacent open to the outermost circumferential main grooves 22 at the intersecting angles φ21, φ22 which are mutually different, thereby promoting the discharge of snow that entered a communicating portion between the through lug grooves 421, 422 and the outermost circumferential main grooves 22 upon movement of the blocks 321, 322 during travel on snowy road surfaces. This has the advantage of the tire snow performance being improved (particularly steering stability and startability). Additionally, mud performance during travel on sludge, sand, and the like, and snow performance have similar characteristics, resulting in the advantage of the mud performance also being improved by action similar to that described above.

Additionally, in the pneumatic tire 1, the first through lug grooves 421 and the second through lug grooves 422 of the second land portion 32 are alternately arranged in the tire circumferential direction (see FIG. 4). Thus, a plurality of sets of groove units including the two types of through lug grooves 421, 422 are continuously arranged in the tire circumferential direction. This has the advantage of the effect of improving snow performance by the two types of through lug grooves 421, 422 being effectively achieved.

Additionally, in the pneumatic tire 1, the first through lug groove 421 and the second through lug groove 422 intersect the outermost circumferential main groove 22 from the same tire circumferential direction (see FIG. 3). Thus, the two types of through lug grooves 421, 422 include the crossing angles φ21, φ22 having the same reference sign. In such a configuration, there is the advantage of the blocks being readily deformed, thereby improving snow discharge properties, compared to a configuration (not illustrated) in which the crossing directions of the through lug grooves with respect to the outermost circumferential main grooves are alternately reversed in the tire circumferential direction, for example.

Additionally, the opening width Wo21 with respect to the outermost circumferential main groove 22 of the first through lug groove 421 having the crossing angle φ21 that is large is preferably less than the opening width Wo22 with respect to the outermost circumferential main groove 22 of the second through lug groove 422 having the crossing angle φ22 that is small (see FIG. 4). Generally, when the crossing angle of the lug groove with the circumferential main groove is increased, the traction characteristics (snow column shear force) of the lug groove tends to decrease. Here, the opening width Wo21 of the first through lug groove 421 having the large crossing angle φ21 is decreased, resulting in the advantage of the traction characteristics being ensured.

Additionally, in the pneumatic tire 1, the first through lug groove 421 includes at least one groove wall provided with a bent portion having a step-like shape that bends in the tire circumferential direction when the tread is seen in a plan view. This has the advantage of the traction characteristics being improved.

Additionally, in the pneumatic tire 1, the first through lug groove 421 and the second through lug groove 422 each have a shape obtained by increasing the groove width toward the tire ground contact edge T side (see FIG. 4). This has the advantage of the snow discharge properties at the crossing position of the through lug grooves 421, 422 and the outermost circumferential main groove 22 being improved.

Additionally, in the pneumatic tire 1, the second land portion 32 includes the plurality of blocks 321, 322 defined by the plurality of through lug grooves 421, 422 (see FIG. 3). The blocks 321, 322 adjacent in the tire circumferential direction have different shapes. In such a configuration, there is the advantage of the block readily deforming and the snow discharge properties being improved.

Additionally, in the pneumatic tire 1, the inclination angle of the first through lug groove 421 as a whole with respect to the tire lateral direction (defined by the angle formed by the tire lateral direction and the imaginary line connecting the opening portions of the through lug groove to the left and right circumferential main grooves; dimension symbol omitted in the drawing) and the inclination angle of the second through lug groove 422 as a whole with respect to the tire lateral direction are mutually different. This has the advantage of the blocks more readily deforming and the snow discharge properties being improved.

Additionally, in the pneumatic tire 1, the shoulder land portions 33 each include the through lug grooves 431 that extend through the shoulder land portion 33 in the tire lateral direction (see FIG. 2). The first through lug groove 421 and the second through lug groove 422 of the second land portion 32, and the through lug groove 431 of the shoulder land portion 33 open to the outermost circumferential main groove 22 at mutually different positions in the tire circumferential direction (see FIG. 3). In such a configuration, the blocks 321, 322 of the second land portion 32 and the block 331 of the shoulder land portion 33 are arranged in a staggered manner in the tire circumferential direction, sandwiching the outermost circumferential main groove 22. This has the advantage of the traction characteristics being improved and the performance on snow (particularly startability) of the tire being improved.

Additionally, in the pneumatic tire 1, the shoulder land portions 33 each include the through lug grooves 431 that extend through the shoulder land portion 33 in the tire lateral direction (see FIG. 2). Additionally, the first through lug groove 421 and the second through lug groove 422 of the second land portion 32, and the through lug groove 431 of the shoulder land portion 33 incline in opposite directions in the tire lateral direction (see FIG. 3). This has the advantage of the traction characteristics on snowy road surfaces during vehicle turning being increased, thereby improving the snow performance (particularly turning performance) of the tire.

Additionally, in the pneumatic tire 1, the through lug groove 431 of the shoulder land portion 33 includes at least one groove wall provided with a bent portion having a step-like shape that bends in the tire circumferential direction when the tread is seen in a plan view (see FIG. 3). This has the advantage of the traction characteristics of the through lug groove 431 being improved and the performance on snow (particularly startability) of the tire being improved.

Additionally, in the pneumatic tire 1, the shoulder land portions 33 each include the non-through lug groove 432 that opens to the outermost circumferential main groove 22 at one end portion and terminates in the contact patch of the shoulder land portion 33 at the other end portion (see FIG. 2). Additionally, the first through lug groove 421 and the second through lug groove 422 of the second land portion 32, and the non-through lug grooves 432 of the shoulder land portion 33 open to the same position of the outermost circumferential main groove 22 in the tire circumferential direction (see FIG. 3). In such a configuration, the blocks 331 of the shoulder land portions 33 each include the non-through lug groove 432, thereby causing the blocks 331 of the shoulder land portions 33 to readily deform during rolling and resulting in the advantage of promoting discharge of the snow held in the crossing positions of the through lug grooves 421, 422 of the second land portion 32 and the outermost circumferential main grooves 22.

Additionally, in the pneumatic tire 1, the groove width $Wg31\_cl$ of the opening portion with respect to the circumferential main groove 22 of the through lug groove 431 of the shoulder land portion 33 and the groove width $Wg32\_cl$ of the opening portion with respect to the circumferential main groove 22 of the non-through lug groove 432 have a relationship such that $Wg32\_cl<Wg31\_cl$ (see FIG. 6). This has the advantage of each function of the through lug groove 431 and the non-through lug groove 432 being provided in a compatible manner.

Additionally, in the pneumatic tire 1, the second land portion 32 includes the two types of blocks 321, 322 defined by the first through lug groove 421 and the second through lug groove 422 adjacent to each other (see FIG. 3). Additionally, the two types of blocks 321, 322 of the second land portion 32 are disposed so that the edge portions on the outermost circumferential main groove 22 side are mutually offset in the tire lateral direction. Additionally, the shoulder land portions 33 each include the through lug grooves 431 that extend through the shoulder land portion 33 in the tire lateral direction, and the blocks 331 defined by the through lug grooves 431, 431 adjacent to each other. Additionally, in the pneumatic tire 1, the blocks 331 of the shoulder land portions 33 each include the non-through lug groove 432 that opens to the outermost circumferential main groove 22 at one end portion and terminates in the contact patch of the shoulder land portion 33 at the other end portion. The pair of edge portions on the outermost circumferential main groove 22 side of the block 331 of the shoulder land portion 33 defined by the non-through lug groove 432 are disposed mutually offset in the tire lateral direction. In such a configuration, the offset amount Ga2 of the edge portions of the two types of blocks 321, 322 of the second land portion 32 and the offset amount Ga3 of the edge portions of the block 331 of the shoulder land portion 33 cause the distance De between the opposing groove walls of the outermost circumferential main groove 22 to form a step-like shape in the tire circumferential direction. This has the advantage of the snow discharge properties of the outermost circumferential main groove 22 during travel on snowy road surfaces being improved.

Additionally, in the pneumatic tire 1, the distance De (see FIG. 7) in the tire lateral direction between the edge portion of the two types of blocks 321, 322 of the second land portion 32 and the pair of edge portions of the block 331 of the shoulder land portion 33 is defined, and the maximum value De_max and the minimum value De_min of this distance De (De_max=De1, De_min=De4 in FIG. 7) have a relationship such that $1.20 \leq \text{De\_max}/\text{De\_min} \leq 1.80$. This has the advantage of the distance De in the tire lateral direction between the opposing edge portions of the left and right land portions 32, 33 sandwiching the outermost circumferential main groove 22 being made appropriate. That is, with $1.20 \leq \text{De\_max}/\text{De\_min}$, the maximum amount of change De_max/De_min of the distance De is ensured, thereby ensuring the effect of improving the snow discharge properties of the outermost circumferential main groove 22. Additionally, with $\text{De\_max}/\text{De\_min} \leq 1.80$, uneven wear of the edge portion of the block caused by an excessively large maximum amount of change De_max/De_min of the distance De is suppressed.

EXAMPLES

FIGS. 10A-10B include a table showing the results of performance tests of pneumatic tires according to embodiments of the technology.

In the performance tests, a plurality of different test tires were evaluated for (1) steering stability performance on snow, and (2) startability performance on snow. Additionally, test tires having a tire size of 265/65R17 112H were mounted on rims having a rim size of 17×8J, inflated to an air pressure of 230 kPa, and loaded with the maximum load defined by JATMA. Additionally, the test tires were mounted on all wheels of a four wheel drive recreational vehicle (RV) having an engine displacement of 3.5 and serving as the test vehicle.

(1) The test vehicle was driven at a speed of 40 km/h on a predetermined handling course that is a snow-covered road for the evaluation of the steering stability performance on snow, and a sensory evaluation was conducted in relation to steering stability by a test driver. Results of the evaluation are expressed as index values and evaluated with the Conventional Example being assigned as the reference (100). In this evaluation, larger values are preferable.

(2) The test vehicle was started from an inactive state on a snow-covered road for the evaluation of the startability performance on snow, and a sensory evaluation was conducted in relation to startability by a test driver. Results of the evaluation are expressed as index values and evaluated with the Conventional Example being assigned as the reference (100). In this evaluation, larger values are preferable.

The test tires of Examples 1 to 10 basically include the configurations of FIGS. 1 and 2, and include the four circumferential main grooves 21, 22 and the five land portions 31 to 33. Additionally, the land portions 31 to 33 each include the plurality of through lug grooves 411, 412, 421, 422, 431 that bend in a Z-shape or crank-like shape, and block rows defined by these through lug grooves 421, 422. Additionally, the opening portions with respect to the outermost circumferential main groove 22 of the through lug grooves 421, 422 of the second land portion 32, and the opening portions with respect to the outermost circumferential main groove 22 of the through lug groove 431 of the shoulder land portion 33 are offset in the tire circumferential direction, and the block rows of the second land portion 32 and the block rows of the shoulder land portion 33 are disposed in a staggered manner in the tire circumferential direction (see FIG. 3). Additionally, the groove depth of the circumferential main groove 22 is 10.0 mm, and the maximum groove depth of the through lug grooves 411, 412, 421, 422, 431 is 7.0 mm. Additionally, the groove width Ws and the groove depth of the circumferential narrow grooves 323, 324 of the second land portion 32 are 2.0 mm and 5.0 mm, respectively. The offset amounts G1, G2 (see FIG. 4) of the groove center lines of the through lug grooves 421, 422 of the second land portion 32 are G1=G2=6.0 mm. Note that, in FIGS. 10A-10B, "2nd" indicates the left and right second land portions 32, 32 and "SH" indicates the left and right shoulder land portions 33, 33.

In the test tire of the Conventional Example, the through lug grooves of the second land portion in the test tire of Example 1 have a constant crossing angle, groove width, and opening width, and the through lug grooves each have a linear shape or an arc shaped. Additionally, the through lug grooves of the second land portion and the through lug grooves of the shoulder land portion face each other at the outermost circumferential main groove, and the block rows of the second land portion and the block rows of the shoulder land portion are disposed side by side in the tire circumferential direction.

As can be seen from the test results, the pneumatic tires of Examples 1 to 10 have improved steering stability performance on snow and startability performance on snow.

The invention claimed is:

1. A pneumatic tire, comprising:
   four or more circumferential main grooves extending in a tire circumferential direction, the four or more circumferential main grooves having a groove width of 5.0 mm or greater and a groove depth of 7.5 mm or greater; and
   five or more rows of land portions defined by the circumferential main grooves; wherein
   when the circumferential main grooves disposed on a left and right on outermost sides in a tire lateral direction are defined as outermost circumferential main grooves, the land portions disposed on the left and right on the outermost sides in the tire lateral direction are defined as shoulder land portions, and the land portions disposed on the left and right in second rows from the outer sides in the tire lateral direction are defined as second land portions,
   the second land portions each comprise first through lug grooves and second through lug grooves that extend through the second land portion in the tire lateral direction and are adjacently arranged in the tire circumferential direction;
   the first through lug grooves and the second through lug grooves intersect the outermost circumferential main groove at different crossing angles;
   the first through lug grooves and the second through lug grooves have a groove width of 2.0 mm or greater and a groove depth of 3.0 mm or greater;

the first through lug grooves comprise at least one groove wall provided with a bent portion having a step-like shape that bends in the tire circumferential direction when the tread is seen in a plan view;

a crossing angle φ21 of the first through lug groove and a crossing angle φ22 of the second through lug groove have a relationship such that 10 degrees≤φ21−φ22≤50 degrees;

the second land portion comprises first and second blocks defined by the first through lug grooves and the second through lug grooves, each of the first and second blocks including one circumferential narrow groove; and the circumferential narrow groove includes a bent portion having a step-like shape that oscillates in the tire lateral direction, the circumferential narrow groove extending through the first and second blocks in the tire circumferential direction and opening to the first and second through lug grooves.

2. The pneumatic tire according to claim 1, wherein the first through lug grooves and the second through lug grooves are alternately disposed in the tire circumferential direction.

3. The pneumatic tire according to claim 1, wherein the first through lug grooves and the second through lug grooves intersect the outermost circumferential main groove from a same tire circumferential direction.

4. The pneumatic tire according to claim 1, wherein an opening width with respect to the outermost circumferential main groove of the first through lug grooves is less than an opening width with respect to the outermost circumferential main groove of the second through lug grooves, wherein a crossing angle of the first through lug grooves is larger than a crossing angle of the second through lug grooves.

5. The pneumatic tire according to claim 1, wherein the first through lug grooves and the second through lug grooves each have a shape obtained by increasing a groove width toward a tire ground contact edge side.

6. The pneumatic tire according to claim 1, wherein an inclination angle of the first through lug grooves as a whole with respect to the tire lateral direction, and the inclination of the second through lug grooves as a whole with respect to the tire lateral direction are mutually different.

7. The pneumatic tire according to claim 1, wherein
the shoulder land portion comprises a through lug groove that extends through the shoulder land portion in the tire lateral direction, and
the first through lug grooves and the second through lug grooves of the second land portion, and the through lug groove of the shoulder land portion open to the outermost circumferential main groove at different positions in the tire circumferential direction.

8. The pneumatic tire according to claim 1, wherein
the shoulder land portion comprises a through lug groove that extends through the shoulder land portion in the tire lateral direction, and
the through lug groove of the shoulder land portion inclines in an opposite direction in the tire lateral direction from an inclination direction of the first through lug grooves and the second through lug grooves of the second land portion.

9. The pneumatic tire according to claim 8, wherein the through lug groove of the shoulder land portion comprises at least one groove wall provided with a bent portion having a step-like shape that bends in the tire circumferential direction when a tread is seen in a plan view.

10. The pneumatic tire according to claim 9, wherein a groove width Wg31_cl of an opening portion with respect to the circumferential main groove of the through lug groove of the shoulder land portion, and a groove width Wg32_cl of an opening portion with respect to the circumferential main groove of the non-through lug groove have a relationship such that Wg32_cl<Wg31_cl.

11. The pneumatic tire according to claim 1, wherein
the second land portion further comprises two types of blocks defined by the first through lug grooves and the second through lug grooves adjacent to each other,
the two types of blocks of the second land portion are disposed so that edge portions on an outermost circumferential main groove side are mutually offset in the tire lateral direction,
the shoulder land portion comprises through lug grooves that extend through the shoulder land portion in the tire lateral direction and are defined by the through lug grooves adjacent to each other,
the blocks of the shoulder land portion each comprise a non-through lug groove that opens to the outermost circumferential main groove at one end portion and terminates inside a ground contact patch of the shoulder land portion at an other end portion, and
a pair of edge portions on the outermost circumferential main groove side of the blocks of the shoulder land portion defined by the non-through lug groove are disposed mutually offset in the tire lateral direction.

12. The pneumatic tire according to claim 11, wherein
a distance De in the tire lateral direction between the edge portion of the two types of blocks of the second land portion and the pair of edge portions of the block of the shoulder land portion is defined, and
a maximum value De_max and a minimum value De_min of the distance De have a relationship such that 1.20≤De_max/De_min≤1.80.

13. The pneumatic tire according to claim 1, wherein 31 degrees≤φ21−φ22≤50 degrees.

14. The pneumatic tire according to claim 1, wherein the bent portion of the circumferential narrow groove is disposed in a central portion of each of the first and second blocks when the first and second blocks are equally divided into three in the tire circumferential direction.

15. The pneumatic tire according to claim 1, wherein the bent portion of the circumferential narrow groove inclines with respect to the tire circumferential direction within a range of from 50 to 70 degrees.

16. The pneumatic tire according to claim 1, wherein a groove width Ws of the circumferential narrow groove is set within a range of 1.5 mm≤Ws≤6.0 mm.

17. The pneumatic tire according to claim 1, wherein the circumferential narrow grooves adjacent in the tire circumferential direction open to a common through lug grooves at different positions.

18. A pneumatic tire, comprising:
four or more circumferential main grooves extending in a tire circumferential direction, the four or more circumferential main grooves having a groove width of 5.0 mm or greater and a groove depth of 7.5 mm or greater; and
five or more rows of land portions defined by the circumferential main grooves; wherein
when the circumferential main grooves disposed on a left and right on outermost sides in a tire lateral direction are defined as outermost circumferential main grooves, the land portions disposed on the left and right on the outermost sides in the tire lateral direction are defined as shoulder land portions, and the land portions disposed on the left and right in second rows from the outer sides in the tire lateral direction are defined as second land portions, the second land portions each comprise first through lug grooves and second through lug grooves that extend through the second land portion in the tire lateral direction and are adjacently arranged in the tire circumferential direction;

the first through lug grooves and the second through lug grooves intersect the outermost circumferential main groove at different crossing angles;

the first through lug grooves and the second through lug grooves have a groove width of 2.0 mm or greater and a groove depth of 3.0 mm or greater;

the first through lug grooves comprise at least one groove wall provided with a bent portion having a step-like shape that bends in the tire circumferential direction when the tread is seen in a plan view;

a crossing angle φ21 of the first through lug groove and a crossing angle φ22 of the second through lug groove have a relationship such that 10 degrees≤φ21−φ22≤50 degrees;

the second land portion comprises first and second blocks defined by the first through lug grooves and the second through lug grooves, each of the first and second blocks including one circumferential narrow groove;

first edge portions of the first and second blocks in one of the circumferential main grooves are disposed mutually offset in the tire lateral direction; and second edge portions of the first and second blocks in an other of the circumferential main grooves are disposed mutually offset in the tire lateral direction.

19. The pneumatic tire according to claim 18, wherein the first block has a long edge portion on a tire equatorial plane side in the tire circumferential direction and a short edge portion on a tire ground contact edge side, the second block has a short edge portion on the tire equatorial plane side in the tire circumferential direction and a long edge portion on the tire ground contact edge side in the tire circumferential direction.

20. The pneumatic tire according to claim 19, wherein the short edge portion protrudes further on a circumferential main groove side than the long edge portion.

* * * * *